United States Patent Office 3,453,526
Patented July 1, 1969

3,453,526
REGULATED D.C. POWER SUPPLY WITH FREQUENCY-SELECTIVE RIPPLE REMOVAL
John Patrick Bowles, Stafford, England, assignor to The English Electric Company Limited, London, England, a British company
Filed June 8, 1967, Ser. No. 644,565
Claims priority, application Great Britain, Aug. 25, 1966, 38,157/66
Int. Cl. H02m 1/08, 7/00
U.S. Cl. 321—19          6 Claims

ABSTRACT OF THE DISCLOSURE

A phase-controlled rectifier arrangement includes a frequency selective circuit responsive to undesired ripple in the output and arranged to modify the phase of the rectifier firing signals in such a sense as to suppress the ripple in addition to maintaining the output at the correct D.C. level.

---

The invention relates to arrangements for suppressing unwanted electrical signal variations such as may occur, for example, in the output of electrical rectifier equipment.

According to the invention, there is provided a closed-loop control system for controlling a unidirectional electrical output level, said system having a loop-gain/frequency characteristic providing a relatively high gain at zero frequency and at least one predetermined frequency above zero, and a relatively low gain at other frequencies.

According to the invention there is also provided a closed-loop control system for controlling the D.C. level of an electrical output, comprising regulating means, first signal producing means responsive to the said D.C. level for producing a first control signal component dependent on the difference between actual and desired values of the D.C. level, second signal producing means responsive to the presence of ripple in the electrical output at at least one predetermined frequency for producing a second control signal component dependent on the said ripple, and control means responsive to a combination of the first and second control signal components for controlling the regulating means so as to tend to maintain the D.C. level at the desired value and to tend to eliminate the said ripple.

According to the invention, there is further provided an A.C. input-D.C. output converter system, comprising a plurality of controllable rectifier devices responsive to the said A.C. input for producing an output containing a D.C. component and ripple at one or more frequencies, the rectifier devices being controllable by firing pulses, first signal producing means for deriving a first control signal component dependent on the difference between actual and desired levels of the said D.C. components, second signal producing means for deriving a second control signal component dependent only on ripple at at least one said frequency, and phase-control means for producing the said firing pulses, the phase-control means being so responsive to a combination of the first and second control signal components as to adjust the time-positions of the firing pulses relative to the A.C. input so as to tend to maintain the D.C. component at the desired level and to tend to eliminate the ripple at the said one frequency.

An A.C. input-D.C. output electrical converter system embodying the invention will now be described by way of example and with reference to the accompanying drawings in which.

Figure 1:
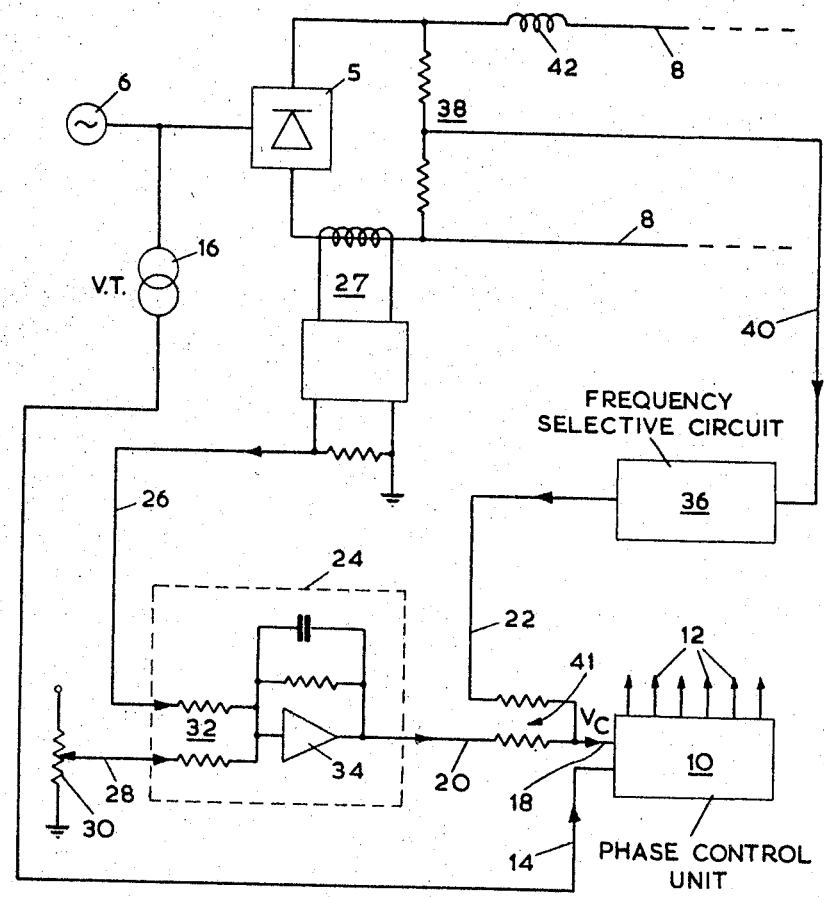
FIGURE 1 is a block diagram of the converter system.

The converter system of FIGURE 1 is for use in a high voltage D.C. power transmission system. The system comprises a grid-controlled multi-phase rectifier arrangement 5 of known type and including a plurality of rectifier units, such as mercury arc rectifier tubes for example, which is supplied from an alternating current power supply 6. The full wave rectified output is produced on a D.C. power transmission line 8; at the other end of the line, not shown, there may be an inverter for re-producing the alternating current power supply.

The level of the rectified output from the rectifier arrangement 5 is controlled by a phase-control unit 10. The phase-control unit 10 has a number of output lines 12 (six such lines in this example), one for each rectifier unit or tube, which are connected (by means omitted from FIGURE 1 for clarity) to the rectifier arrangement 5. Each line 12 controls a respective one of the rectifier units in the rectifier arrangement 5 and carries pulses for rendering the respective rectifier unit conductive. The time-position of the pulses within each cycle of the alternating current supply is adjustable, in a manner to be described, and determines the level of output from the rectifier tubes, and thus the level of output on the transmission line 8.

The phase control unit 10 is supplied on a line 14 with a signal derived through a voltage transformer 16 and representing the multi-phase alternating current supply to the rectifier arrangement 5. The phase-control unit 10 is also supplied with a control signal Vc on a line 18.

Figure 2:
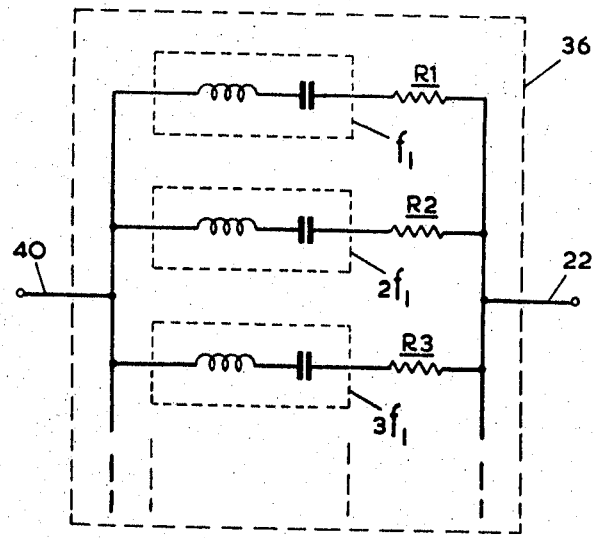
FIGURE 2 is a circuit diagram of part of the converter system in more detail.

The control signal Vc has two components supplied respectively on lines 20 and 22. The component on the line 20 is derived from a comparator and amplifier unit 24. The unit 24 receives a first signal on a line 26 which is derived by means of a direct current transformer 27 from the transmission line 8 and represents the D.C. level of the rectified output from the rectifier arrangement 5, and a second signal on a line 28 which is a reference signal and is set by means of a potential divider 30 according to the desired D.C. level of the rectified output. The unit 24 contains a summing network 32 for algebriacally summing the signals received on the lines 26 and 28 so as to derive an output representing the error between the actual and desired D.C. level on the transmission line 8; the unit 24 also includes an operational amplifier 34 for amplifying this error output and feeding it to the phase-control unit 10 on the line 20. The second component of the signal Vc, the component on the line 22, is supplied through a frequency selective circuit 36 which is energised by means of a line 40 from a potential divider 38 connected across the transmission line 8. The signal on the line 40 will contain components respectively representing the D.C. level on the line 8 and unwanted ripple at fundamental and various other harmonic frequencies. The frequency selective circuit 36 is arranged to remove the component representing the D.C. level and to allow to pass only those components representing ripple at one or more particular frequencies which it is desired to suppress. The frequency selective circuit 36 may, for example, comprise a plurality of parallel-connected narrow band tuned filters as shown in FIGURE 2: the output, on the line 22, from a frequency selective circuit such as shown in FIGURE 2 therefore comprises a signal representing ripple at the fundamental and the second and third harmonic frequencies. A summing unit 41 algebriacally adds the signals received on the lines 20 and 22 to produce the resultant control signal Vc on the line 18.

In operation, the phase-control unit 10 responds to the control signal Vc by adjusting the phase of the firing pulses on the lines 12, relative to the phase of the incoming alternating supply as represented by the signal on the line 14, so as to alter the output from the rectifier arrangement 5 in such a direction as tends to reduce the control signal Vc to zero. When the control signal Vc is zero, it will be seen that not only is the error between the desired and actual D.C. level on the transmission line reduced to zero, but any of the harmonics present on the transmission line 8 and selected by the frequency selective circuit 36 are also eliminated.

The output from the rectifier arrangement 5 may be contaminated by ripple at a number of different harmonic frequencies. For example, specific harmonics, such as the 6th, 12th, 18th etc. harmonics, may be inherently present on the transmission line due to the converter operation, and as the presence of these harmonics can be anticipated, filters may be connected to the line 8 to attenuate them. However, further harmonics, including the fundamental, may rise due, for example, to asymmetry in the system or due to a fault such as tube misfire, tube fire through, or commutation failure, for example, in the case of a mercury arc rectifier tube. As these further harmonics are not inherently present on the transmission line, but may arise in a haphazard fashion, it is not normally economical to provide filters for them and a control system such as described is particularly advantageous since it enables particular harmonics (including the fundamental) to be more or less completely eliminated without the necessity for expensive filters working under power conditions. Furthermore, it will be appreciated that a D.C. transmission line has capacitance and inductance, and may in addition also include smoothing inductors 42 connected at each end of the lines. The transmission line may therefore have one or more natural resonant frequencies. If a harmonic occurs at or close to one of these natural resonant frequencies, over-voltages could appear on the line due to voltage magnification; the arrangement described is therefore also advantageous in that, by suppressing such undesired harmonics, it eliminates the need for the extra insulation on the line which would otherwise be necessary to withstand these over-voltages.

It should be noted that there is a theoretical limit to the number of harmonics which can be eliminated in the manner described, that is, by adjusting the firing angle of the firing pulses on the lines 12; in addition, it will be apparent that it may not be possible completely to cancel a particular harmonic if its amplitude is very large.

Figure 3:
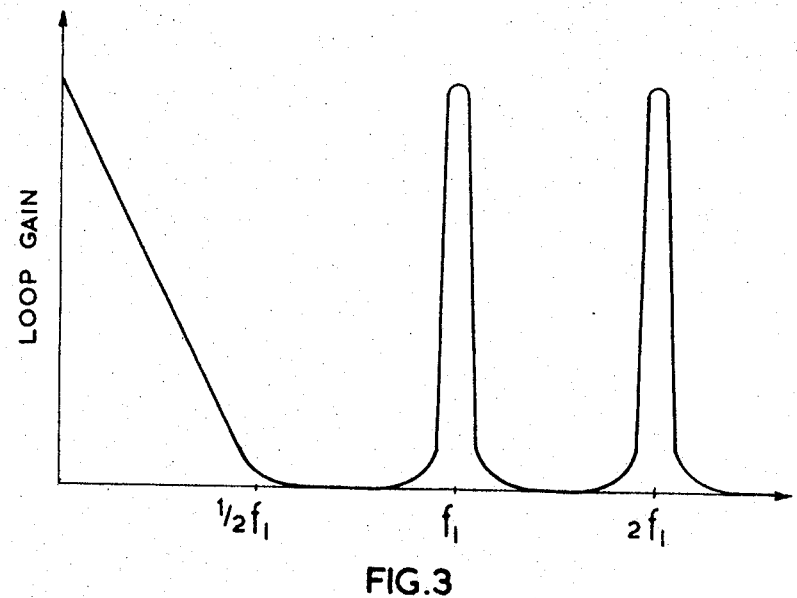
FIGURE 3 is a characteristic curve of the converter system.

FIGURE 3 shows the loop gain versus frequency charateristic of the control system described. The loop gain is seen to fall rapidly as the frequency increases from zero but to rise again to peaks coinciding with each of the harmonics to be suppressed. This form of characteristic therefore ensures a high loop gain at zero and low frequencies, as is necessary for high accuracy and speed of control of the D.C. level of the output, as well as providing a high loop gain as is necessary to suppress each of the undesired harmonics. At the same time, the characteristic provides a low loop gain for all other frequencies above very low frequency so that the control system does not react to any inherently present harmonics (the 6th, 12th, 18th harmonics for example, as explained above) which are suppressed by filters (not shown) directly connected to the line 8; if the characteristic were such that the gain was substantially constant with frequency, then instability could arise due to these inherent harmonics.

Although the frequency selective circuit 36 has been shown to be responsive to a proportion of the output voltage, as derived by the potential divider 38, it will be appreciated that, instead, the circuit 36 may be arranged to respond to the line voltage, the line current, the rate of change of line current, or the rate of change of line voltage, or any other suitable signal or a combination of such signals.

Although the invention has been described as embodied in an A.C. to D.C. converting system, it will be appreciated that it may be applied to a converter operating as an inverter or in any other closed-loop control system where it is desired to suppress particular ones of unwanted harmonic frequencies in a controlled output. The output may be controlled by any suitable means, and need not necessarily be controlled by means of a control unit, such as the control unit 10, which produces adjustable firing pulses.

I claim:
1. A closed-loop control system for controlling a unidirectional electrical output, comprising
   regulating means adjustable to regulate the value of the output,
   control means connected to the regulating means for adjusting the regulating means in dependence on a control signal,
   first signal-producing means connected to be responsive to the said electrical output for producing a first control signal component depedent on the difference between actual and desired values of the D.C. value thereof,
   second signal-producing means including frequency selective means, said frequency selective means being connected to be responsive to the presence of ripple in the electrical output at at least one predetermined frequency so as to produce a second control signal component dependent on the said ripple at that frequency and being substantially unresponsive to at least one other frequency,
   combining means for combining the said first and second control signal components to produce the said control signal, and
   means feeding the control signal to the said control means whereby the control means controls the regulating means so as to tend to maintain the D.C. value of the output at the desired value and to tend to eliminate the said ripple at the predetermined frequency.

2. A system according to claim 1, in which the said second signal-producing means includes means responsive to the said electrical output for producing said intermediate signal dependent thereon, and frequency selective means being connected to respond to the said intermediate signal for filtering therefrom said second control signal component representing the said ripple.

3. A system according to claim 1, in which the said frequency selective means is responsive to the presence of ripple in the said electrical output at a plurality of different predetermined harmonically related frequencies whereby the said second control signal component is dependent on ripple at all these predetermined frequencies, the said second signal-producing means comprising means responsive to the said electrical output for producing an intermediate signal dependent thereon, and the said frequency selective means comprising a plurality of band-pass filter means each of which has a pass band corresponding to a respective one of the said different predetermined harmonically related frequencies.

4. A system according to claim 1, in which the said regulating means includes at least one controllable rectifier means responsive to an A.C. input for producing the said electrical output, said control means comprising means for producing firing pulses for the controllable rectifier means and means for adjusting the time-positions of the firing pulses relative to the A.C. input in dependence on the value of the control signal whereby to vary the electrical output.

5. A system according to claim 4, in which the said first signal-producing means comprises
   a direct current transformer responsive to the said electrical output for deriving an intermediate signal dependent only on the D.C. value thereof, reference means producing a reference signal representing the desired D.C. value, summing means responsive to the intermediate signal and the reference signal for producing an error signal dependent on the difference if any therebetween, and amplifying means for amplifying the error signal to produce the said first control signal component.

6. A system according to claim 4, including at least one filter directly connected to the said controllable rectifier means for substantially eliminating ripple at a frequency different from the said one frequency.

References Cited

UNITED STATES PATENTS

| 2,630,557 | 3/1963 | Bixby | 321—18 |
| 3,290,578 | 12/1966 | Ainsworth | 321—10 XR |
| 3,290,579 | 12/1966 | Hausner | 321—9 |
| 3,325,716 | 6/1967 | Gomi | 321—18 XR |

JOHN F. COUCH, *Primary Examiner.*

W. M. SHOOP, JR., *Assistant Examiner.*

U.S. Cl. X.R.

323—22, 34